United States Patent [19]

Simon

[11] 4,436,265

[45] Mar. 13, 1984

[54] CABLE SOCKET WITH TRACTION RELIEF FOR THE HOUSINGS OF ELECTRIC MACHINES

[76] Inventor: Hans Simon, Bruchhausener Strasse, 5463 Unkel am Rhein, Fed. Rep. of Germany

[21] Appl. No.: 261,241

[22] Filed: May 6, 1981

[30] Foreign Application Priority Data

May 12, 1980 [DE] Fed. Rep. of Germany ....... 3018119

[51] Int. Cl.³ .................... H02G 3/18; H01B 17/26; F16L 5/00
[52] U.S. Cl. .................................. 248/56; 174/153 G
[58] Field of Search ............... 174/65 G, 135, 152 G, 174/153 G; 16/2; 248/56; 339/103 B

[56] References Cited

U.S. PATENT DOCUMENTS

| | | | |
|---|---|---|---|
| 4,089,496 | 5/1978 | Mizusawa | 174/153 G X |
| 4,108,507 | 8/1978 | Renner et al. | 174/153 G X |
| 4,169,572 | 10/1979 | Simon | 174/153 G X |

FOREIGN PATENT DOCUMENTS 2822643 11/1979 Fed. Rep. of Germany ........ 248/56

Primary Examiner—Laramie E. Askin
Attorney, Agent, or Firm—Steinberg & Raskin

[57] ABSTRACT

A cable socket adapted to be mounted in an opening formed in a housing wall for providing traction relief for a cable passing therethrough includes a tubular grommet insertable in the housing wall opening and an inner socket portion coaxially situated within the tubular grommet so as to be twistable therein around the common axis, the inner portion having a passage opening for receiving a cable and including a flexible extension for encompassing a cable passing through the passage opening, the flexible extension having a free end region, and a device for securing the free end region of the flexible extension of the inner socket portion to the tubular grommet so that it is prevented from twisting with respect to the grommet when the inner socket portion is twisted within the grommet. In operation, upon twisting the inner portion with respect to the grommet with a cable received in the passage opening and the free end region of the flexible extension secured to the grommet so as to be prevented from twisting with respect thereto, the flexible extension is twisted to compress against the cable to hold the same in the socket and provide tension relief therefor.

16 Claims, 10 Drawing Figures

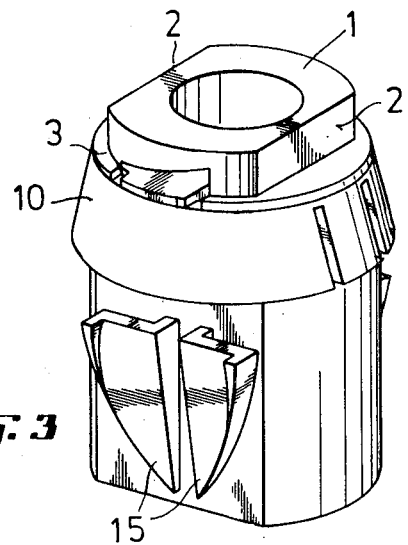
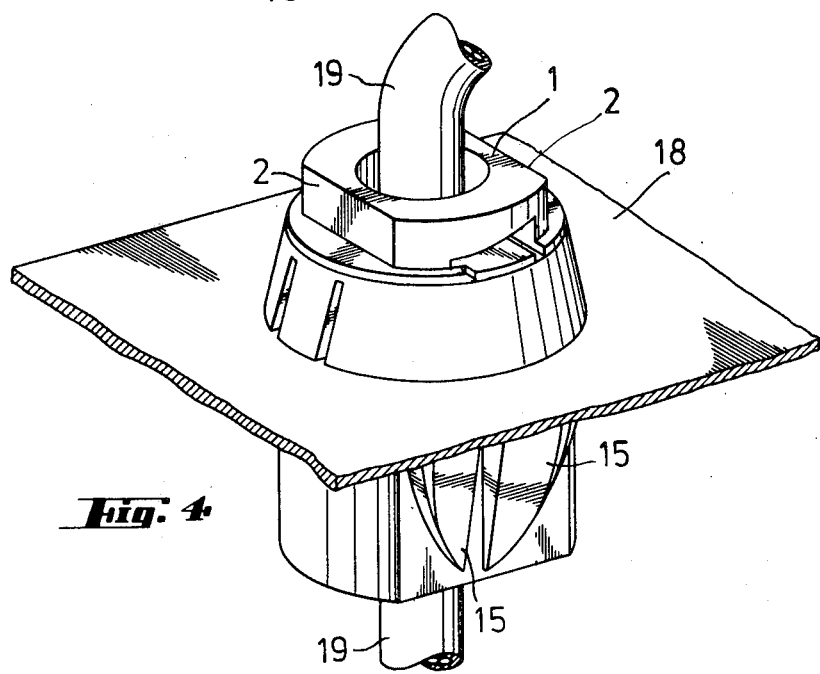

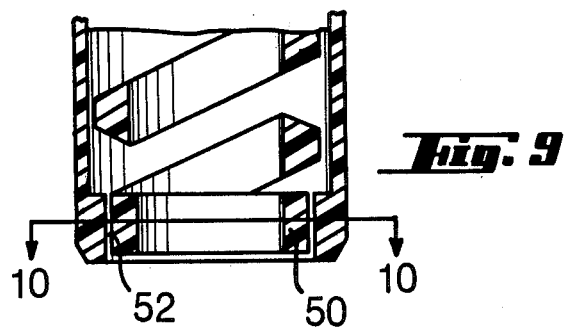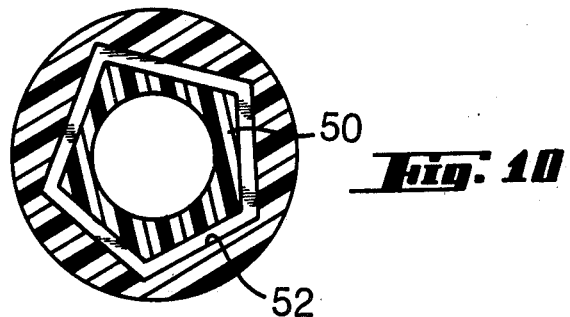

CABLE SOCKET WITH TRACTION RELIEF FOR THE HOUSINGS OF ELECTRIC MACHINES

BACKGROUND OF THE INVENTION

The invention relates to a cable socket provided with traction relief for the housings of electric machines and devices, which makes possible the insertion of a cable, protected from the edges of the passage opening, into a housing and to secure it at the same time against traction and twist. Strict requirements in connection with traction relief, a large clamping range, simple handling and cheap production should be met.

Traction reliefs of this sort for cables are known in various shapes. They are primarily employed for mains supply cables, the mantles of which are made of soft elastic insulating material. Depending on the structure thereof, however, part of them show coniderable deficiencies in that they bend the cable, pinch into the cable like pliers, or have only a small clamping range or include only a single clamping position and thus do not meet the demands of industry and their associations.

Starting from the prior art as resulting from Applicant's German Offenlegungsschrift No. 2,750,713, subject matter of which is disclosed in applicant's U.S. Pat. No. 4,169,572 wherein a cable grommet with traction relief is described, which meets already the above-mentioned demands, it is the aim of the present invention to provide a highly effective traction relief clamping over a particularly great area, the clamping ranges of which make possible a reliable anchorage of the cable over a clamping range which exceeds 50% of the diameter of the passage opening while no projections and puncture forming pressures on the cable are required.

SUMMARY OF THE INVENTION

This problem is solved by a cable socket with traction relief for the housings of electric machines and devices comprising a tubular grommet of hard elastic insulating material insertable into an opening of the housing, the grommet including a head mounted on the housing wall and an inner socket portion coaxially provided within the grommet and twistable and lockable relative to the grommet having a passage opening for the cable, the cable grommet being characterized in accordance with the present invention in that the inner portion is provided with a flexible extension for encompassing the cable the free end of which is reliably secured against twisting within the grommet.

Such a cable socket is similar with respect to the grommet and the inner portion of the socket coaxially provided therein and twistable and lockable relative to the grommet, to the cable socket disclosed in the above-mentioned German Offenlegungsschrift No. 2,750,713 and U.S. Pat. No. 4,169,572. The clamping mechanism for the anchorage of the cable differs however basically therefrom and provides significant advantages with respect to the anchorage of the cable within the cable socket with respect to the gentle handling of the cable on one hand and anchorage against traction and increased clamping area on the other which are not provided by other prior art cable sockets.

In the cable socket according to the present invention as characterized above, the tubular inner portion is therefore coaxially provided in the grommet which is also tubularly shaped and may be twisted over 360° relative to the grommet and may be locked in any position. The flexible extension provided on the inner portion for encompassing the cable however is secured at the free end thereof to prevent the twisting of that free end in the grommet. The consequence is that when twisting the inner portion this flexible extension is itself snaked or twisted and thus tightly encompasses the cable to clamp it fast.

In accordance with the present invention, it has proved to be particularly advantageous if the flexibe inner portion extension for encompassing the cable consists of a relatively thin-walled tube or pipe. In accordance with another advantageous embodiment, the flexible inner portion extension for encompassing the cable consists of a plurality of axially extending ribbons preferably integral therewith, and in accordance with a particularly advantageous embodiment of the present invention, the flexible inner portion extension for encompassing the cable consists of at least one coil or spiral preferably integral therewith. These extensions of the inner portion are suitably manufactured in the course of one working operation together with the inner portion.

Anchorage of the free end of the extension against twist in the grommet, which is absolutely necessary in order to hold the cable encompassed by the extension immovable in the cable socket, may be effected in various ways.

According to one embodiment the free end of the inner portion extension encompassing the cable is connected to the free end of that grommet, either by extrusion of inner portion and grommet in one piece or by means of adhesive, welding, clamping or the like.

In accordance with another advantageous embodiment, the free end of the inner portion extension for encompassing the cable has a triangular or multi-angular outer shape and is located within the grommet having a corresponding triangular or multi-angular inner passage and is thus secured against twist but is on the other hand shiftable in axial direction.

This has the particular advantage that when clamping the cable, the extension may be shortened without any difficulties when the ribbons, or the spiral, respectively, when twisting the inner portion relative to the grommet, bends around the cable and locks it against tensile stress.

In accordance with another advantageous embodiment of the present invention, the free end of the inner portion extension encompassing the cable is provided with one or a plurality of noses guided within one or a plurality of axially parallel grooves on the inner side of the grommet. It has shown to be particularly suitable if on the inner side of the grommet two grooves are provided which face each other and extend over the whole length of the grommet, and the free end of the inner portion extension for encompassing the cable is annularly shaped and includes the two noses integral therewith, which are guided in the two grooves of the grommet. The free end of the flexible inner portion extension is thus shiftable in axial direction, however reliably secured against twist relative to the grommet.

For the arrangement of the inner portion within the grommet, it has proved to be very suitable if the two grooves provided on the inner side of the grommet open at the head end into a circular channel within which two locking protuberances provided under the head of the inner portion are guided. These protuberances are inserted, during mounting, into the longitudinal groove openings in the head of the grommet and by twisting the inner portion they pass into the circular channel where they safely lock the inner portion in the grommet in axial direction.

It has shown to be particularly suitable, if the longitudinal grooves on the inner side of the grommet are closed, at the head, by stop means. Tooth structure may serve as such means, which when insering the inner portion into the grommet spring back and allow the annular free end of the flexible extension with the integral protuberances as well as the two noses provided under the head of the inner portion to pass and subsequently close the longitudinal grooves.

The inner portion is thus locked in the axial direction in the grommet by the two protuberances provided under the head of the inner portion. By means of two key faces provided on the head, it may, on the other hand, easily be twisted by means of a screw spanner relative to the grommet, which is conventionally provided in the opening of the housing and is secured either by a counter nut or by means of locking wings against torsion.

It has also been shown to be very suitable if the longitudinal grooves provided in the grommet include lateral outbreaks near the free end of the grommet into which the noses integral with the annular end of the inner portion latch in. To this end, elastic projections or the like have for instance been provided, behind which the noses latch in.

In this way, the free end of the flexible extension for encompassing the cable is arrested against twist as well as against a movement in axial direction.

The noses so secured to the annular end of the inner portion inprove the anchorage of the inner portion within the grommet, for which also the protuberances provided under the head of the inner portion are additionally provided, which are located in the circular channel in the head end of the grommet.

In the above described embodiment according to the invention, the annular end of the flexible inner portion extension is therefore secured against traction as well as against twist in the grommet, while the head of the inner portion, which is provided with key faces for a screw spanner is twistable relative to the grommet and may be locked in any position.

In accordance with a further advantageous embodiment of the cable socket according to the invention, the grooves extending on the inner side of the grommet are closed at the free end of the grommet. In this way, the penetration of dust, humidity etc. into the grommet is largely avoided.

Although the cable socket according to the invention holds the cable very gently because of the very large clamping area of the cable though very reliably against traction relief in axial direction, there may be provided, in accordance with a further advantageous embodiment of the present invention, on the flexible extension encompassing the cable, additional clamping ribs, holding teeth, holding knubs or the like. In this way, the tensile strength of the cable socket is further increased.

The cable socket according to the invention is advantageously produced of plastic material and is suitably manufactured by an injection molding process.

DESCRIPTION OF THE DRAWINGS

Based on the embodiments depicted in the attached drawings, the invention is now explained in detail.

In the drawings,

FIG. 3 shows the grommet with the inner portion of FIG. 1 included.

FIG. 4 shows the cable socket of the invention with the inserted cable.

FIG. 9 is a cross-sectional view of the lower portion of a cable socket showing another embodiment of means for fixing the free end region of the flexible extension of the inner portion; and FIG. 10 is a section view taken along line 10—10 of FIG. 9.

DESCRIPTION OF THE PREFERRED EMBODIMENTS

Figure 1:
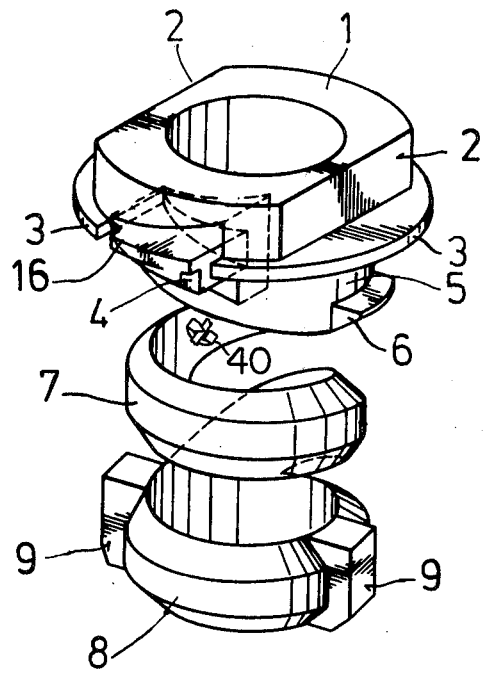
FIG. 1 shows one embodiment of the inner portion of the cable socket according to the invention.

The inner portion of the cable socket shown in FIG. 1 comprises a head 1 provided with two key faces 2 facing each other for applying a screw spanner and a collar 3 located below it, which serves as a support. On at least one of the sides free from the key faces 2 of the head, a wedge-shaped stop element 4 unilaterally connected to the head is located, which serves for locking the cable socket inner portion within the grommet and cooperates with teeth 11 provided in head 10 of the grommet to be described in detail in the following.

Below the collar 3, an annular shoulder 5 of head 1 is provided, on which radially and outwardly at least one locking protuberance 6 is located. To this annular shoulder 5, the flexible extension 7 for encompassing the cable is attached, which in the example shown is shaped as a spiral or coil. Instead of one coil or spiral, two or a plurality of such coils may be provided. This flexible extension 7 terminates in an annular portion 8 on which, and integral with which, two radially outwardly directed noses 9 are provided. These noses 9 serve for locking the annular end of the socket inner portion against twisting. The inner side of the flexible extension for encompassing the cable is smooth and devoid of any projections and assures in view of the large clamping area a reliable traction relief in the axial direction. It is understood that conventional holding teeth, holding ribs and the like may also be provided on the inner side of this flexible extension, e.g., the illustrated example on the inner side of the spiral, and thus provide for an additional improvement in the traction relief provided.

The pitch of spiral 7 may vary from very flat or short to very steep or long. It may also consist of axially extending parallel ribbons only, which when twisting the inner portion of the socket relative to the grommet will encompass the cable and reliably secure the latter against axial tension.

Figure 2:
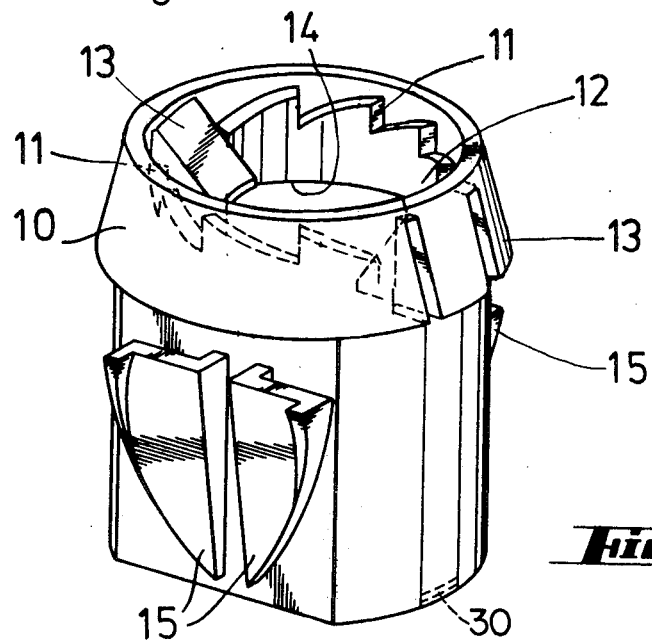
FIG. 2 shows the grommet of the cable socket of the invention insertable and lockable in the wall of the housing.

The grommet shown in FIG. 2 includes a notched base by which it is inserted and locked in the opening of the housing. On the other hand, it may also be shaped as a threaded socket. The grommet is mounted on a housing wall 18 with its enlarged support head 10 situated over the housing wall 18 and with the locking wings 15 located behind the housing wall to lock the grommet fast to wall 18.

On the inner side of grommet support head 10, conventional teeth 11 are provided, which cooperate with the wedge-shaped stop element 4 of the inner socket portion. On the inner side of the grommet, at least one continuous longitudinal groove 12 is provided. This longitudinal groove or longitudinal grooves, respectively, are each covered by a movable tooth 13. The interior of the essentially tubular hollow body of the grommet includes, below the teeth 11, an inwardly directed collar 14, which forms a channel in which the protuberance 6, or the protuberances, respectively, of the inner socket portion are supported during twisting.

Figure 6:
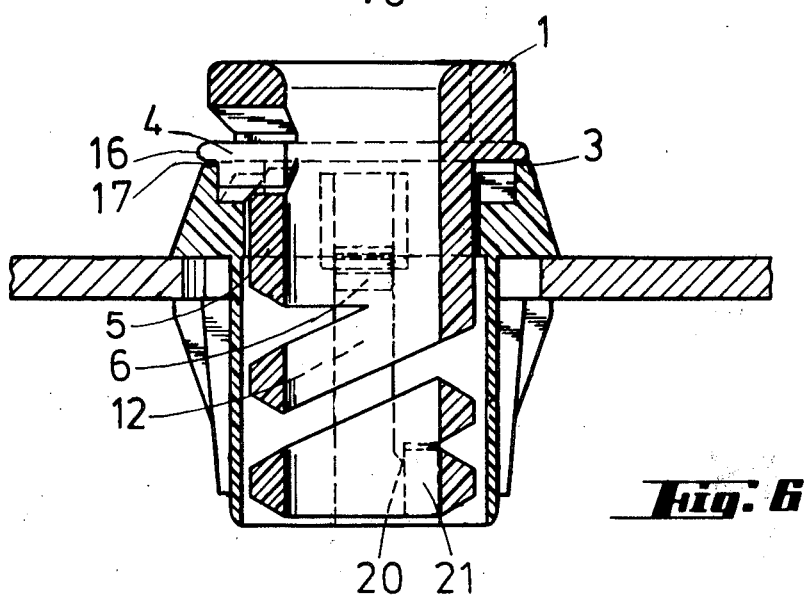
FIG. 6 shows a section along line 6—6 of FIG. 5.

The axially directed groove, or grooves 12, respectively, include at the lower end thereof, radial recesses 21, as shown in FIG. 6, which will be explained in detail below and which serve for fixing the noses 9 of the inner socket portion.

In FIG. 3, the assembled cable socket, that is the grommet with the inner socket portion inserted, is depicted.

FIG. 4 shows a cable socket according to the invention inserted into the passage opening of an apparatus housing wall 18, with a cable 19 being clamped fast by head 1 provided with key faces 2 and which is relieved against traction in the axial direction.

Figure 5:
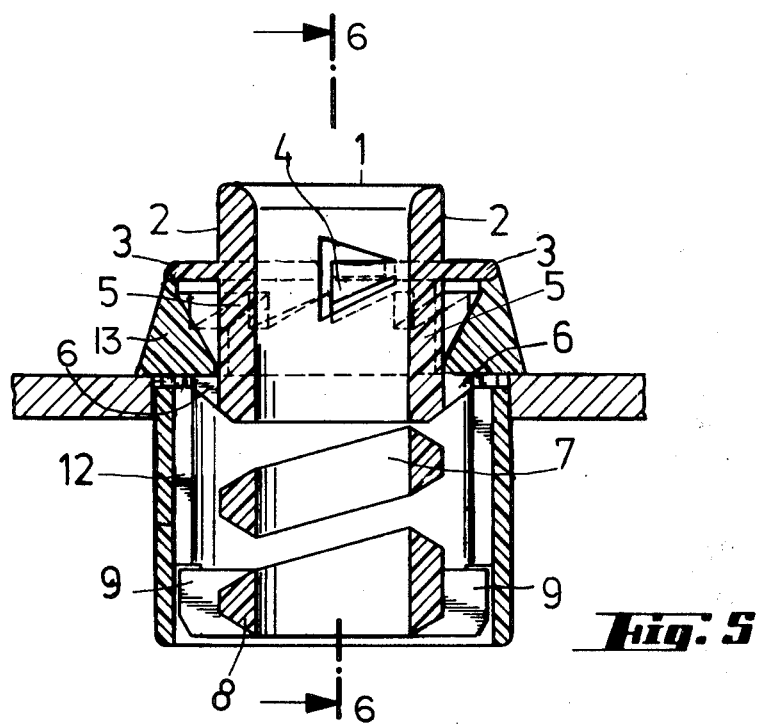
FIG. 5 shows the cable socket of the invention comprising grommet and inserted inner portion, according to the FIG. 1 embodiment, in cross section.

In the embodiment of the cable socket according to the invention shown in FIG. 5 in cross section and in FIG. 6 in a cross section turned at 90° along line 6—6 of FIG. 5, the same reference numerals are employed to designate corresponding parts as in the foregoing figures.

In FIG. 6, a groove 12 and the recess 21 radially emanating therefrom are shown by dashed lines only. Into this recess 21, a corresponding nose 9 of annular member 8 is received and retained by means of a stop tooth 20 so that the nose 9 cannot snap back into longitudinal groove 12 when opening the traction relief. The mode of operation of stop element 4 mentioned in connection with FIG. 1 is seen in FIGS. 5 and 6. The stop element 4 includes an edge 16 forming together with the upper edge of the grommet a gap 17. By inserting a screw driver blade into this gap, the stop element 4 may be lifted and moved out of its stop position so that the inner portion may be untwisted relative to the grommet, the gripping of cable 19 may be relieved and the cable may be removed from the cable socket.

Figure 7:
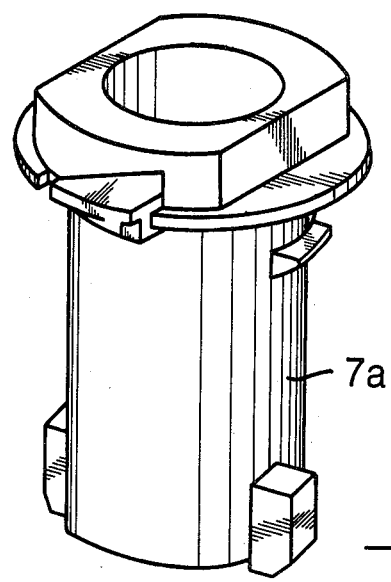
FIG. 7 is a perspective view similar to FIG. 1 showing another embodiment of the inner portion of the cable socket according to the present invention.

FIG. 7 shows an embodiment of the flexible inner portion extension 7a in the form of a relatively thin-walled tube or pipe.

Figure 8:
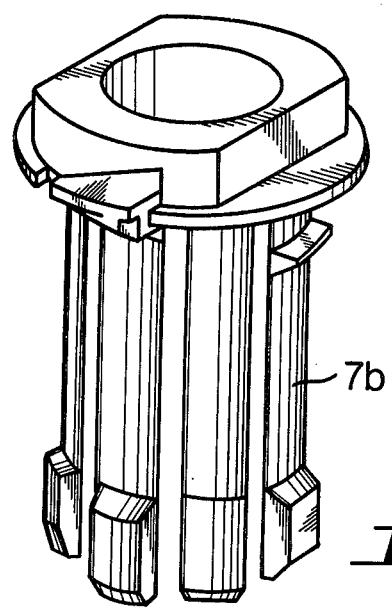
FIG. 8 is a perspective view similar to FIG. 1 showing yet another embodiment of the inner portion of the cable socket according to the present invention.

FIG. 8 shows another embodiment of the flexible inner portion extension 7b for encompassing the cable in the form of a plurality of axially extending ribbons.

FIGS. 9 and 10 show the lower portion of a cable socket in accordance with the invention wherein the means for fixing the free end of the flexible extension of the inner portion with respect to the grommet comprises a non-circular free end region 50 received within a corresponding non-circular inner passage 52 of the grommet so as to be secured against twisting but which permits axial shifting of the free end region therein.

The grooves 12 extending on the inner side surface of the grommet may be closed at the free end of the grommet as indicated in phantom at 30 in FIG. 2 in order to avoid the penetration of dust, humidity and the like into the grommet.

The inner cable grasping surface of the flexible extension may be provided with additional clamping ribs, holding teeth, holding knobs or other clamping means as generally designated 40 in FIG. 1.

As it is not necessary to provide for a positive limitation the rotation of the inner portion, the inner portion may be rotated for more than 360°, if necessary. The clamping range of the cable socket according to the invention is consequently very considerable.

Obviously, numerous modifications and variations of the present invention are possible in the light of the above teachings. It is therefore to be understood that within the scope of the claims appended hereto, the invention may be practiced otherwise than as specifically disclosed herein.

I claim:

1. A cable socket providing traction relief adapted to be mounted in an opening formed in a wall of a housing for electrical components, comprising:

a tubular grommet insertable into an opening in a housing wall and including a grommet head for supporting the grommet on a housing wall;

an inner socket portion coaxially situated within said tubular grommet so as to be twistable therein around a common axis of the grommet and inner portion, said inner portion having a passage opening for receiving a cable and including a head portion and a flexible extension for encompassing a cable passing through said passage opening, said flexible extension having a first end connected to said head portion and a free end region spaced from said head portion;

means for securing said free end region of said flexible extension of said inner socket portion to said tubular grommet so that said free end region is prevented from twisting with respect to said grommet when said inner socket portion is twisted within said grommet; and means for locking said inner socket portion to said grommet against rotation therein, whereby upon twisting said inner portion with respect to said grommet with a cable received in said passage opening and said free end region of said flexible extension secured to said grommet by said securing means so as to be prevented from twisting with respect to said grommet, said flexible extension is twisted to compress against the cable to hold the same in the socket.

2. Cable socket according to claim 1, wherein said flexible inner portion extension for encompassing a cable comprises a relatively thin-walled tube.

3. Cable socket according to claim 1, wherein said flexible inner portion extension for encompassing a cable comprises a plurality of parallel ribbons.

4. Cable socket according to claim 3 wherein said ribbons are formed integrally with said head portion of said innr socket portion.

5. Cable socket according to claim 1, wherein said flexible inner portion extension for encompassing a cable comprises at least one coil.

6. Cable socket according to claim 5 wherein said coil is formed integrally with said head portion of said inner socket portion.

7. Cable socket according to claim 1, wherein the free end region of said inner portion extension for encompassing a cable is connected to a free end of said grommet.

8. Cable socket according to claim 1 wherein said free end region of said inner portion extension for encompassing a cable has a non-circular cross-sectional outer shape and said grommet has a corresponding non-circular inner passage portion, and wherein said free end region of said flexible extension is arranged within said passage portion so as to be shiftable in the axial direction but secured against twist therein.

9. Cable socket according to claim 1, wherein said free end region of said inner portion extension for encompassing said cable has at least one nose extending therefrom and at least one axially extending groove is formed on an inner side surface of said grommet and wherein said at least one nose is received and guided within a corresponding one of said grooves.

10. Cable socket according to claim 9, wherein said at least one groove includes two grooves facing each other on the inner side surface of said grommet and which extend over the whole length of said grommet and wherein said free end region of said inner portion extension for encompassing said cable is annularly shaped and is guided by respective ones of two of said noses integral therewith within said two grooves in said grommet.

11. Cable socket according to claim 10, wherein said two grooves formed in the inner side surface of said grommet open at the end of said grommet adjacent said head thereof into a circular channel formed in said grommet and wherein at least one protuberance is formed extending outwardly from said inner portion under the head of said inner portion, said protuberances being received in said circular channel.

12. Cable socket according to claim 11, wherein stop means are provided on said grommet, said stop means being removably situated in each of said grooves at said head ends thereof.

13. Cable socket according to claim 10, wherein said axially extending grooves provided in said grommet include lateral outbreaks near a free end of the grommet into which the noses provided at the annular end region of said inner portion are receivable.

14. Cable socket according to claim 8, wherein said grooves extending on the inner side surface of said grommet are closed at the free end of said grommet.

15. Cable socket according to claim 1, wherein said flexible inner portion extension for encompassing said cable is provided with clamping means on an inwardly facing surface thereof.

16. Cable socket according to claim 1, wherein said grommet and the inner portion situated therein are injection molded from plastic material.

* * * * *